United States Patent

Pyle

[11] 4,405,594
[45] Sep. 20, 1983

[54] PHOTO SEPARATORY NOZZLE

[75] Inventor: Walter R. Pyle, Richmond, Calif.

[73] Assignee: Chevron Research Center, San Francisco, Calif.

[21] Appl. No.: 304,131

[22] Filed: Sep. 21, 1981

[51] Int. Cl.³ .............................................. C01B 13/00
[52] U.S. Cl. .......................................... 423/579; 55/15;
  55/17; 55/392; 422/128; 422/186; 423/648 R;
  423/659
[58] Field of Search .................... 423/579, 648 R, 659;
  22/128, 129, 186, 198, 240; 55/15, 17, 392;
  203/28, DIG. 1

[56] References Cited

U.S. PATENT DOCUMENTS

| | | | |
|---|---|---|---|
| 3,362,131 | 1/1968 | Becker | 55/17 |
| 3,877,892 | 4/1975 | Bley et al. | 55/17 |
| 4,053,576 | 10/1977 | Fletcher | 423/648 R |
| 4,233,127 | 11/1980 | Monahan | 423/648 R |
| 4,235,606 | 11/1980 | Becker et al. | 55/17 |
| 4,246,007 | 1/1981 | Becker et al. | 55/17 |

FOREIGN PATENT DOCUMENTS

| | | | |
|---|---|---|---|
| 916065 | 12/1972 | Canada | 55/17 |
| 54-123695 | 9/1979 | Japan | 55/17 |
| 1439284 | 6/1976 | United Kingdom | 55/17 |
| 2037610 | 7/1980 | United Kingdom | 55/17 |

Primary Examiner—O. R. Vertiz
Assistant Examiner—Wayne A. Langel
Attorney, Agent, or Firm—D. A. Newell; E. J. Keeling; R. H. Evans

[57] ABSTRACT

A system for the thermal dissociation of gaseous matter into its component parts using solar energy and a molecular beam skimmer.

6 Claims, 3 Drawing Figures

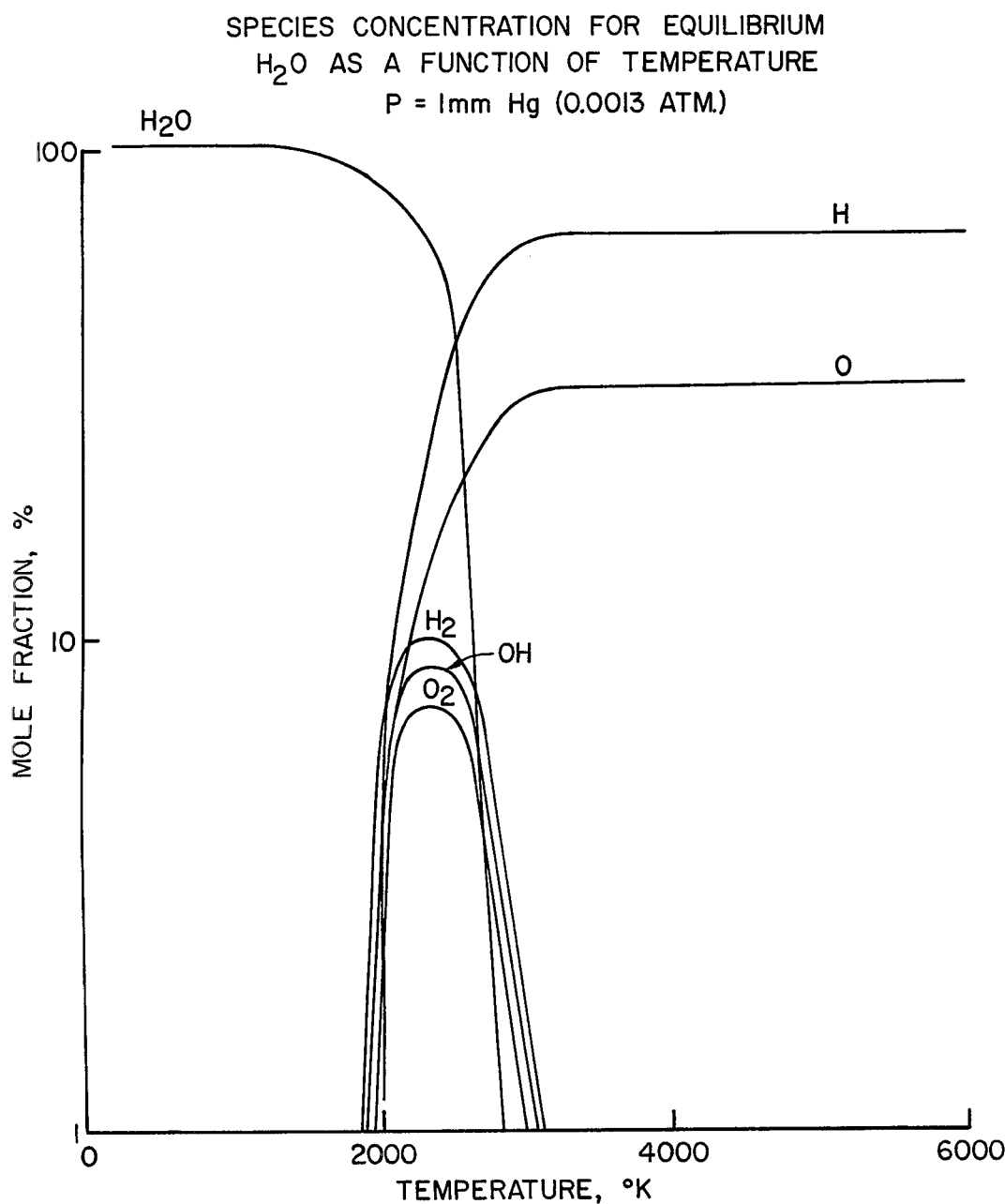
FIG._1.

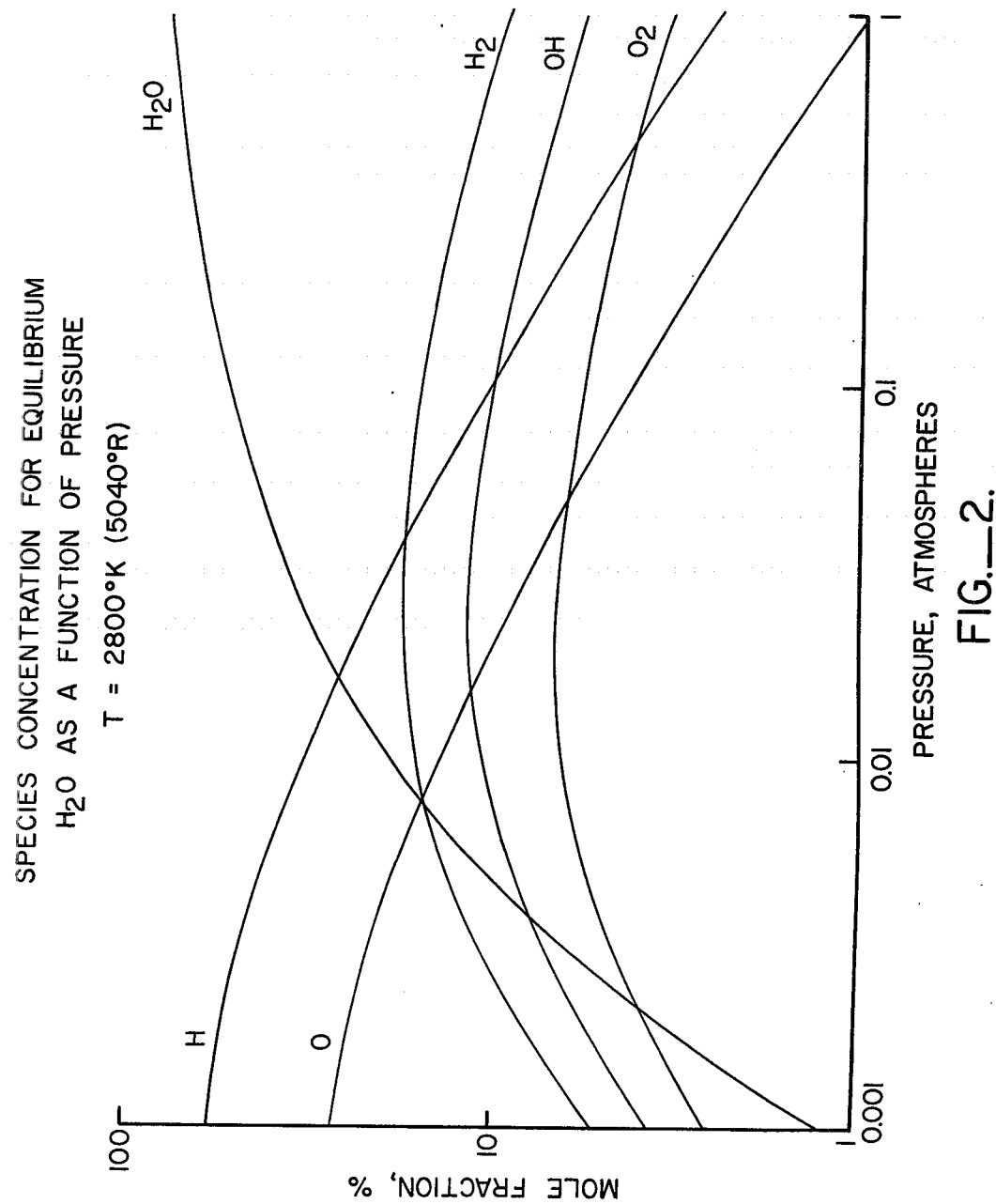

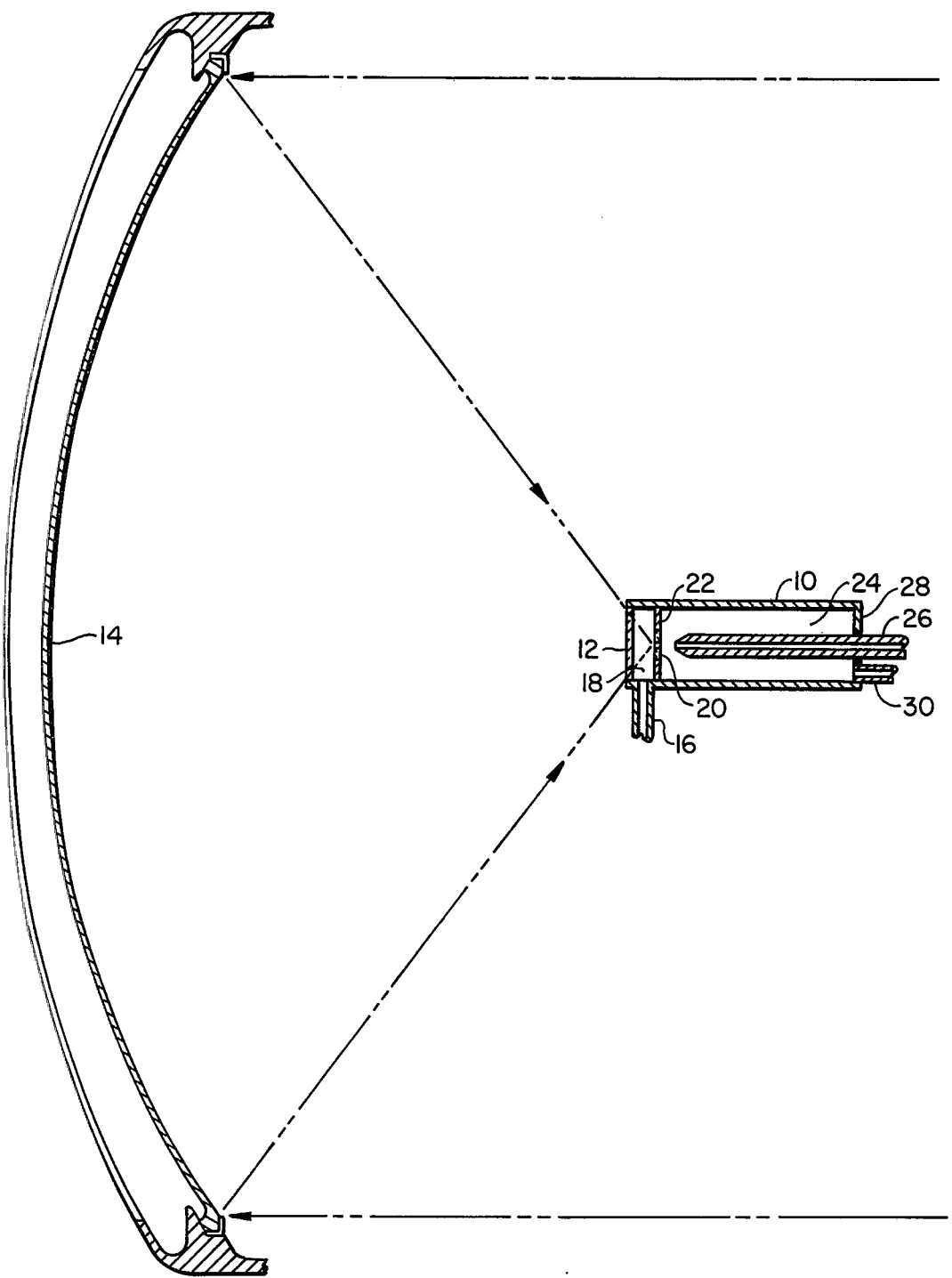
FIG._3.

PHOTO SEPARATORY NOZZLE

FIELD OF THE INVENTION

This invention relates to a system for the thermal dissociation and recovery of the components from a molecular species.

BACKGROUND OF THE INVENTION

With the dwindling supplies of fossil fuels, attention is being increasingly focussed on solar energy as a viable alternative energy source to be harnessed in various commercial and domestic settings. Of particular interest are the methods and apparatus devised for the thermal dissociation of molecules into their constituent parts and the recovery thereof. Although such systems are applicable to a myriad of processes, such as hydrogen production from methane, and the dissociation of pollutants or hazardous compounds, a preferred usage lies in the production of hydrogen and oxygen from water.

In all attempts to harness solar energy, storage of the energy for use during periods of insufficient sunlight or during nighttime posses a problem. Partial solutions to the problem have included heating various masses to increase their thermal energy content by temperature increases, phase changes or reversible chemical reactions. Such systems, however, suffer numerous drawbacks due to the low quality heat involved, the means of energy retrieval, and system degradation. On the other hand, if water is decomposed into hydrogen and oxygen, a valuable clean burning fuel is produced overcomes many problems of the prior art.

This approach has been advocated by various contributors in the field. U.S. Pat No. 4,030,890, issued June 21, 1977, to Richard E. Diggs, for example, teaches using a parabolic reflector to concentrate solar radiation to thermally dissociate steam into hydrogen and oxygen. Separation of the respective components is achieved by passing the components through a spiral housing to separate the heavier components from the lighter components.

U.S. Pat. No. 4,053,576, issued Oct. 11, 1977, to Edward A. Fletcher, also discloses a system for producing and separating hydrogen and oxygen from water. In this system the water is thermally dissociated by concentrated solar energy, and separation is achieved by permitting the hydrogen to preferentially diffuse through the walls of a permeable housing.

Both of the above inventions suffer, however, from numerous defects. The most readily apparent problem which is common to both systems resides in the fact that the water must be contained in a heat-conductive housing upon which the energy is focussed that is capable of withstanding the intense heat required for the thermal dissociation. At temperatures in the range 1800° to 3500° Kelvin, finding suitable materials for gas-tight housing or housing of specific permeability is difficult.

A second common problem results from the lack of means to quickly prevent recombination of the separated components.

The present invention avoids these problems and achieves the desired separation in a unique and novel manner.

SUMMARY OF THE INVENTION

In accordance with the present invention, method and means are provided for the thermal decomposition and recovery of the components or composites from one or more molecular species. Generally, the species is heated by concentrated solar energy to thermally dissociate the species into its component parts. The components are then rapidly cooled to deter recombination and may then be separated into heavier and lighter molecular weight fractions with a molecular beam skimmer for recovery.

The present invention is particularly useful for separating water into hydrogen and oxygen for their production per se or as a solar energy scheme having an efficient energy storage system.

In one preferred embodiment of apparatus suitable for practicing the invention, a parabolic dish reflector is used to gather and concentrate incident solar radiation. A housing having a transparent cover or wall is located within the path of the converging radiation. The light passes through the cover and is focussed at or near an outlet orifice located in an intermediate wall of the housing. Gaseous feed materials entering the housing through an inlet port are thus forced to pass through a region of intense solar radiation before exiting the outlet orifice.

Deterring recombination of the thermal dissociation products may be achieved by permitting the heated products to expand and cool in passing through the orifice. If the gases achieve supersonic flow, the products may also be separated in streams according to their relative molecular weight with a beam skimmer or separatory baffle located downstream from the orifice.

DESCRIPTION OF THE DRAWINGS

FIG. 1 is a graph of species concentration for equilibrium $H_2O$ as a function of temperature.

FIG. 2 is a graph of species concentration for equilibrium $H_2O$ as a function of pressure.

FIG. 3 depicts apparatus suitable for practicing one embodiment of the invention.

DETAILED DESCRIPTION OF THE INVENTION

Solar energy concentrators, such as parabolic reflectors, may be used to thermally dissociate water molecules. A graph of the resulting components as a function of temperature is shown in FIG. 1 of the drawings. As shown in the figure, water begins to dissociate at temperatures of less than 2000° Kelvin and is completely dissociated into monatomic hydrogen and oxygen at a temperature of about 3200° Kelvin. Diatomic hydrogen and oxygen, as well as hydroxyl groups, exist in equilibrium with the components of dissociation at intermediate temperatures. In accordance with LeChatelier's principle, higher pressures favor the formation of the combined species, and FIG. 2 charts the equilibrium species concentration as a function of pressure at a temperature of 2800° Kelvin.

FIG. 3 of the drawings depicts apparatus which is suitable for practicing the present invention. As shown therein, and as discussed in greater detail below, a housing 10, having a transparent cover 12 is provided in combination with a parabolic reflector 14. Inlet port 16 is provided in housing 10 for the introduction of water vapor to the interior of a first chamber 18 in the housing. A ceramic orifice 20 is located in an intermediate wall 22 of the housing near the focal point of the reflector, and provides an exit for the effluent thermal dissociation products and any unconverted water vapor from chamber 18. Effluent from the housing 10 passes through the ceramic orifice into a second chamber 24. Orifice 20 is designed such that for the respective pressures in the chambers, sonic flow will exist across the orifice and trans sonic flow downstream of the orifice in the second chamber 24. A tubular separatory baffle 26 extends through a rear wall 28 of housing 10 into the shock pattern produced by the effluent. The heavier components of the stream, such as oxygen and any unconverted water molecules, are preferentially separated by the baffle 26 from the hydrogen which passes from the chamber 24 via conduit 30.

The parabolic reflector 14 shown in FIG. 3 is, of course, merely exemplary of one type of solar radiation concentration means which may be used to advantage. The reflector may be constructed of silvered glass, polished metal or any other materials known in the art which are capable of suitably reflecting the parallel incident solar radiation to the focal point. Reflective dishes having a concentration ratio of 2000:1, or greater, are preferred to achieve the required temperatures.

An elongated parabolic trough reflector may also be used. In such a case, the geometry of the ceramic orifice and the separating baffle would assume a linear shape running along the line of focus. In addition, convex lenses or Fresnel lenses may be used to focus the sun's rays on the outlet orifice of a vapor-filled chamber located beneath the lens.

Preferably, the parabolic dish is mounted upon a moveable frame (not shown) for tracking the apparent path of the sun in its movement across the sky. Such tracking means are well known to those skilled in the art and need not be further discussed herein.

Housing 10 is mounted along the central axis of the parabolic dish at a distance somewhat less than the focal length of the reflector. The housing will have one, or more, inlet ports 16 for the introduction of water vapor, or steam thereto. No special materials of construction are required for the housing, although the materials must have a sufficient strength to withstand the pressure differential across its walls from atmospheric pressure to the inlet vapor pressure, which will normally be a maximum of about one atmosphere.

A transparent cover 12 is sealably affixed to the end of housing 10 facing the reflector for the transmission of the converging radiation to the interior of a first chamber 18 in the housing. The cover is preferably constructed of quartz, or tempered glass and should have a cross-sectional area sufficiently large for reception of the conically converging radiation without suffering extreme temperatures.

Ceramic orifice 20 is located in an intermediate wall 22 of the housing near the focal point of the reflector. All of the incoming gaseous feed is forced to exit chamber 18 through the orifice and is thus passed through a region of intensely concentrated energy. Preferably, the orifice is made of quartz, molybdenum, or stainless steel with a ceramic coating of rare earth oxide such as zirconium oxide, thorium oxide or hafnium oxide, stabilized with calcium oxide or magnesium oxide. Stabilized cubic zirconia is especially preferred. The finished orifice should be capable of withstanding temperatures up to 3200° Kelvin and, more preferably, up to 4000° Kelvin. While the shape of the orifice is not unduly critical, i.e., conical, Laval, thin plate orifice, or sonic nozzle, a conical nozzle is preferred. Regardless of the geometry, the orifice is preferably sized such that the effluent passing therethrough achieves supersonic velocity and establishes a stable shock pattern downstream from the orifice.

Effluent passes through the orifice 18 into a second chamber 24. Generally, the second chamber should be compactly sized to provide a minimum of interference with the incident solar radiation to the reflector, but should be large enough to allow development of the desired shock pattern. A tubular separatory baffle 26, or skimmer, extends through a rear wall 28 of housing 10 to provide a flowpath for the central volume of the shock pattern effluent. This device effectively captures or separates the heavier molecular weight species such as oxygen and unconverted water from the hydrogen-enriched stream which exits chamber 24 through conduit 30. Normally, conduit 30 and skimmer 26 will be connected to vacuum pumps in order to ensure the proper pressure differential across the orifice to produce the shock wave.

The sudden expansion across the orifice due to the pressure drop cools the gaseous products considerably and effectively retards recombination.

Under the preferred operating conditions, superheated steam will be introduced to the system at a pressure of about 2–760 Torr and exhuast into the upper housing at a pressure of about 1–360 Torr. Generally, the orifice area will be in a ratio of 1:1,000,000 to the dish area at these pressures.

While the above apparatus has been particularly described with regard to the thermal dissociation of water, it is to be appreciated that the device can be used for the thermal dissociation of various compounds and the recovery of their component parts. It is also apparent that many modifications and variations of this invention as set forth may be made without departing from the spirit and scope thereof. The specific embodiments are given by way of example only, and the invention is limited only by the terms of the following appended claims.

I claim:

1. Apparatus for the thermal dissociation of water vapor into hydrogen and oxygen, which comprises:

a housing having a transparent wall;

solar energy concentration means to direct solar energy through said transparent wall to provide a region of concentrated solar energy within said housing;

an inlet port in said housing for the introduction of water vapor into said housing and an outlet orifice in said housing for the removal of effluent hydrogen, oxygen and any unconverted water vapor therefrom, said outlet orifice being positioned near said region of concentrated solar energy and said inlet port being positioned to direct the water vapor through said region of concentrated solar energy, said outlet orifice sized for the operating conditions such that the effluent attains supersonic flow after passing through said outlet orifice; and a separating baffle placed downstream from the outlet orifice for separating the effluent into a hydrogen-rich stream and an oxygen-rich stream.

2. Apparatus as recited in claim 1, wherein said concentration means is a parabolic dish reflector.

3. Apparatus as recited in claim 2, wherein said outlet orifice is conically shaped.

4. Apparatus as recited in claim 3, wherein said orifice has a ceramic coating.

5. Apparatus for the thermal dissociation of gaseous matter into its lighter and heavier component species, which comprises:

a housing having a transparent wall;

a solar energy concentration means to direct solar energy through said transparent wall to provide a region of concentrated solar energy within said housing;

an inlet port in said housing for the introduction of gaseous matter into said housing and an outlet orifice in said housing for the removal of effluent component species therefrom, said outlet orifice being positioned near said region of concentrated solar energy and said inlet port being positioned to direct the gaseous matter through said region of concentrated solar energy, said outlet orifice sized for the operating conditions such that the effluent attains supersonic flow after passing through said outlet orifice; and a separating baffle placed downstream from said outlet orifice for separating the effluent into a heavier component-rich stream and a lighter component-rich stream.

6. A method for thermally dissociating water vapor into hydrogen and oxygen, comprising:

introducing water vapor into a chamber at a first pressure between about 2 and 760 Torr;

heating said water vapor to thermally dissociate at least a portion thereof into hydrogen and oxygen with concentrated solar energy;

passing said hydrogen and oxygen and unconverted water vapor through an orifice at a second pressure between about 1 and 360 Torr, to produce a supersonic molecular jet of hydrogen, oxygen and unconverted water vapor, to produce a shock wave downstream of said orifice, to rapidly cool said hydrogen, oxygen and unconverted water vapor and to retard recombination of same; and separating said jet in said shock wave into a hydrogen-rich stream and an oxygen-rich stream with a beam skimmer.

* * * * *